Aug. 12, 1969     C. L. HUTSON     3,460,255

ORAL EVACUATOR

Filed Oct. 3, 1967                          2 Sheets-Sheet 1

INVENTOR
CLIFFORD L. HUTSON

BY Paul A. Weilein

ATTORNEY

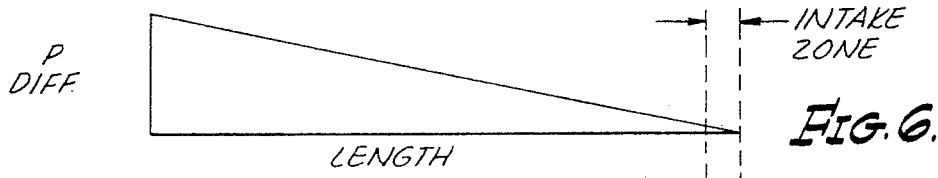
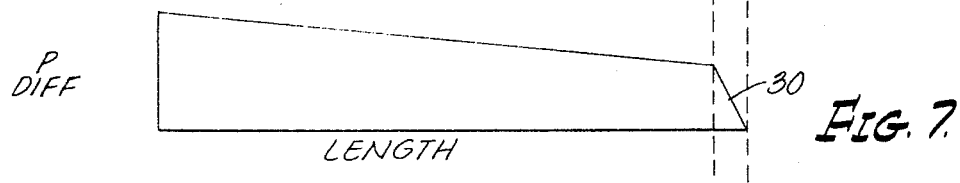
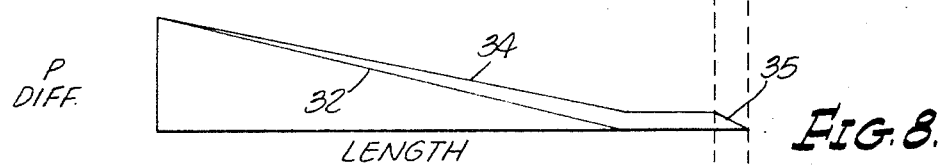
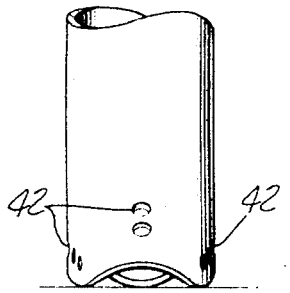
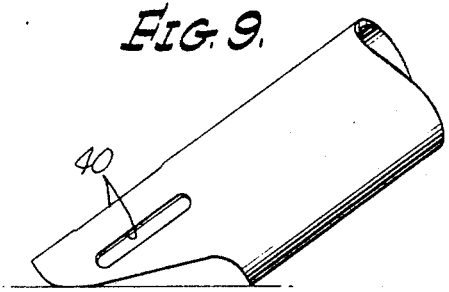
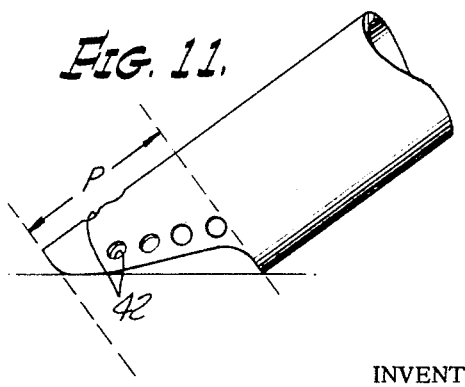

United States Patent Office 3,460,255
Patented Aug. 12, 1969

3,460,255
ORAL EVACUATOR
Clifford L. Hutson, 885 Cumberland Road,
Glendale, Calif. 91202
Filed Oct. 3, 1967, Ser. No. 672,544
Int. Cl. A61c *17/04*
U.S. Cl. 32—33                                15 Claims

ABSTRACT OF THE DISCLOSURE

The end of a dentist's vacuum-actuated oral evacuator is cut off at an angle to provide an intake zone and auxiliary openings through the wall of the evacuator are provided in the intake zone.

Background of the invention

It is old in the art to provide an oral evacuator in the form of a tube that is cut off at an acute angle, say an angle of approximately 30°, to form an elongated end intake port for evacuating saliva and for entraining debris created in the course of dental work. Such an evacuator tube is described in the disclosure of my Patent No. 3,299,511, which disclosure is hereby included in the present disclosure by reference. The dentist maneuvers the tip of such an evacuator tube to best advantage in the course of the dental work and my above mentioned patent teaches that the evacuator tube may be swiveled and provided with a knurled collar for finger tip rotation by the dentist in the course of the procedure.

In the patent disclosure the intake zone, i.e., the zone in which the saliva and debris are entrained is defined by axial extent of the elongated end intake port. For maximum effectiveness close to the working area the intake zone should not be much longer than twice the diameter of the tube bore and preferably is less. Thus, if the inside diameter of the evacuator tube is ⅜ inch the length of the intake zone may be approximately ½ inch or slightly longer and if the inside diameter is ⁵⁄₁₆ of an inch the length of the axial zone should not be much longer than ⅜ inch. Any portion of an intake zone which is spaced farther from the evacuator tube tip by substantially more than twice the inside diameter of the tube is relatively far from the working area where the debris originates.

The elongated intake port that is formed by cutting the end of the evacuator tube at an acute angle extends across the whole cross sectional area of the tube bore and, therefore, if the elongated end intake port is not blocked, the intake velocity through the port is determined by the length of the tube, the inside diameter of the tube, and the pressure differential across the length of the tube. More often than not, however, the inclined end intake port is blocked to some degree while it is in operation. If the inclined end intake port is in close proximity to hard tissue such as tooth structure or mucosa covering hard bone, the rate of intake flow is distinctly reduced. If the inclined intake port is positioned in close proximity to soft tissue such as tongue tissue or cheek tissue or tissue at the floor of the mouth, a tissue block usually occurs, the soft tissue being drawn into the intake port in a manner that completely seals and blocks the intake port. When a tissue block occurs to stop all intake flow, the pressure inside the tube drops to substantially the level of the vacuum source and the intruding soft tissue is subjected to the maximum pressure differential with consequent damage to the tissue.

One important object of the invention is to avoid subjecting soft tissue to such a maximum pressure differential.

Another object of the invention is to practically eliminate the possibility of the intake flow being interrupted or too severely curtailed and a related object is to provide an evacuator tube with intake ports on three sides of the tube in the intake zone.

A further object is to insure relatively high velocity intake flow in the intake zone during most of the manipulations of the evacuator in the course of dental work.

A still further object is to provide for distribution of the high velocity intake flow throughout at least the major portion of the length of the intake zone of the evacuator tube under most operating conditions.

Summary of the invention

In an oral evacuator of the present type, two distinct advantages are obtained by truncating the point of the tube that is formed by the angular end cut. One advantage is that the axial dimension of the intake zone is reduced. The second advantage is that an end clearance space is created for intake flow when the elongated end intake port is positioned against an unyielding oral surface such as tooth structure or along mucosa covering hard bone structure.

It is also advantageous to cut back the opposite longitudinal edges of the elongated end intake port to produce clearance spaces for intake flow when the elongated end intake port is placed against an unyielding oral surface. Thus, what may be termed three clearance spaces are provided comprising the end clearance space and the two side clearance spaces. For explaining how the invention functions for its purpose, it is convenient to assume that the three clearance spaces are measured with the elongated end intake port positioned in face-to-face contact with a hard planar surface.

The important feature taught by the present invention is the provision of auxiliary intake ports extending lengthwise of the intake zone near the opposite longitudinal edges of the elongated end intake port. In the preferred embodiment of the invention the auxiliary intake ports comprise two slots close to and substantially parallel with the two opposite side edges, respectively, of the elongated end intake port. Each of the two slots extends along the major portion of the intake zone with the major portion of the slot in the upper half of the intake zone. In a second embodiment of the invention the auxiliary ports comprise slots in the intake zone that are substantially parallel with the axis of the tube instead of being parallel with the opposite side edges of the elongated end intake port. In a third embodiment of the invention the auxiliary ports comprise at least two rows of relatively small holes with the rows extending lengthwise of the intake zone near the opposite side edges, respectively, of the elongated end intake port with the major portion of the area of the holes in the upper half of the intake zone.

As heretofore stated, the effective cross sectional area of the elongated end intake port is equal to the cross sectional area of the bore of the evacuator tube. In a selected embodiment of the invention the cross sectional area of the end clearance space that is provided by truncating the pointed end of the tube may be approximately 0.3 of the cross sectional area of the tube bore; the total cross sectional area of the two side clearance spaces that are produced by cutting away side edges of the elongated end opening may be approximately 0.4 of the cross sectional area of the tube bore; and the total cross sectional area of the two auxiliary intake ports in the form of slots is in the range of 0.3 to 0.7 of the cross sectional area of the tube bore, for example, approximately 0.4 of the cross sectional area of the tube bore, the two slots being substantially parallel to and close to the opposite side edges, respectively, of the elongated end intake port.

If the elongated end intake port is positioned against the surface of an unyielding oral structure the end clearance space and the two side clearance spaces as well as the two longitudinal slots are effective for intake flow. If soft tissue completely blocks the elongated end port, the two auxiliary slots are effective and, as heretofore noted, together may have approximately 0.4 the cross sectional area of the tube bore. Thus, if the elongated end intake port is completely blocked by tissue the total cross sectional area of the intake ports drops below the cross sectional area of the tube bore and, consequently, the pressure inside the tube adjacent the intake zone drops to result in an increased pressure differential across the intake zone.

It is to be borne in mind that the velocity of flow through an intake port varies directly with the pressure differential across the port and varies inversely with the cross sectional area of the port. Since complete blockage of the large end intake port drastically reduces the total effective cross sectional area of the intake ports of the intake zone and at the same time the pressure differential across the intake zone is boosted, it is apparent that when the two auxiliary slots carry all of the intake flow their efficiency for entraining saliva and debris is vastly increased. Thus, although the total cross sectional area of the two auxiliary slots is only 0.4 of the cross sectional area of the elongated end intake port, their combined effectiveness is at some higher ratio and may actually equal or exceed the normal effectiveness of the elongated end port.

The features and advantages of the invention may be understood by reference to the following detailed description and the accompanying drawings.

Brief description of the drawings

In the drawings which are to be regarded as merely illustrative:

FIGS. 6, 7, and 8 are graphs representing the pressure drop along an evacuator tube under different conditions;

FIG. 9 is a view similar to FIG. 3 illustrating a second embodiment of the invention;

FIG. 10 is a view similar to FIG. 4 illustrating the second embodiment;

FIG. 11 is a view similar to FIGS. 3 and 9 illustrating a third embodiment of the invention; and FIG. 12 is a view similar to FIGS. 4 and 10 further illustrating the third embodiment.

Description of the preferred embodiments

Figure 1:
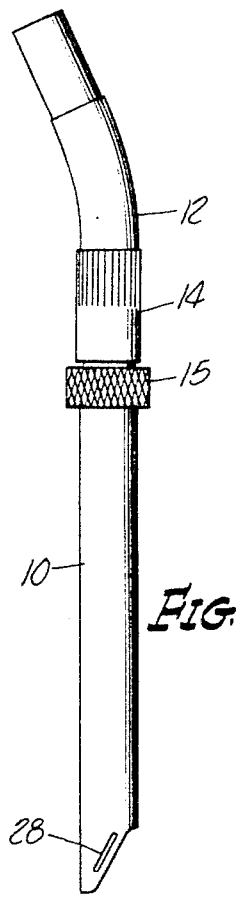
FIG. 1 is a side elevational view of the presently preferred embodiment of the invention.
Figure 2:
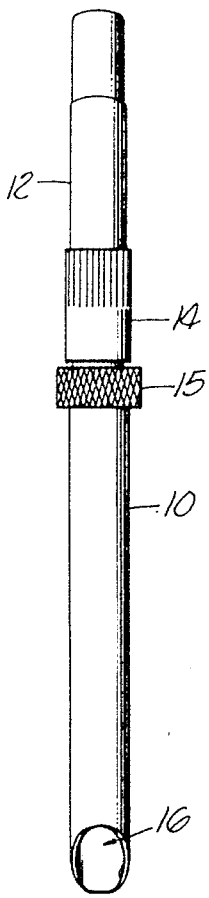
FIG. 2 is a side elevational view taken at 90° from the view in FIG. 1.

In FIGS. 1 and 2, illustrating a preferred embodiment of the invention, an evacuator tube 10 for use in dental work is connected by a tubular means 12 to a vacuum source in a well known manner. The evacuator tube is mounted on the tubular means 12 by a swivel joint inside a sleeve 14 and the evacuator tube is provided with a knurled collar 15 for finger tip rotation by the dentist as he maneuvers the evacuator tube in the course of dental work.

The working end of the evacuator tube 10 is cut off at an angle of approximately 30° relative to the axis of the tube to provide an elongated end intake port 16. Preferably, the pointed nose that is formed by the angular cut is cut off or truncated to form a blunt nose 18 and, in addition, each of the two opposite side edges of the end intake port 16 are arcuately cut away as best shown in FIGS. 3 and 5.

Figure 5:
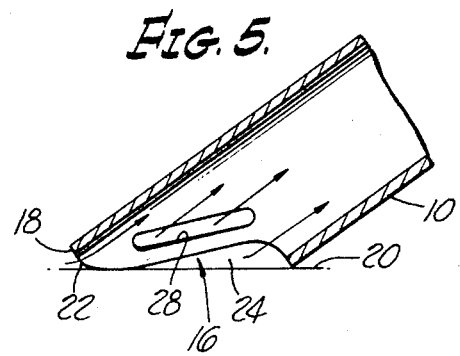
FIG. 5 is a longitudinal section taken along the line 5—5 of FIG. 4.
Figure 4:
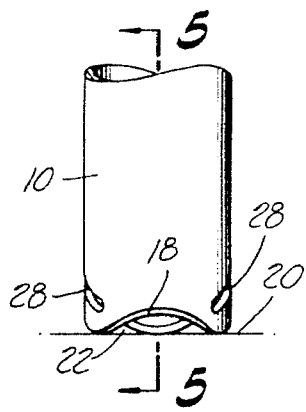
FIG. 4 is a similar elevational view as seen along the line 4—4 of FIG. 3.
Figure 3:
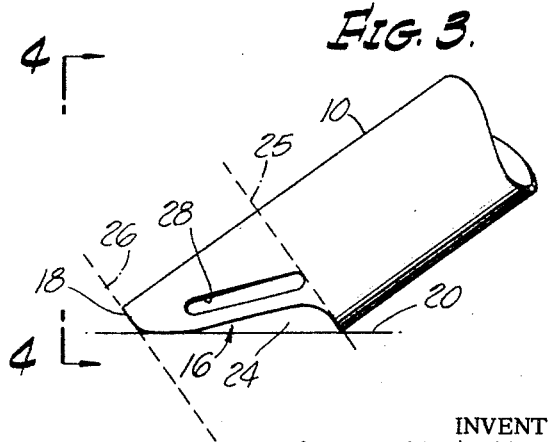
FIG. 3 is a greatly enlarged side elevation of the end portion of the evacuator tube with the elongated intake port positioned in face-to-face contact with an unyielding surface.

If the end intake port 16 is placed in face-to-face contact with a solid or unyielding surface 20 as shown in FIGS. 3 and 4, the blunt nose 18 will form an end clearance space 22 shown in FIG. 4 and the cut-away portions of the two side edges of the end intake port 16 will form two opposite side clearance spaces 24 as shown in FIGS. 3 and 5.

The axial extent of the elongated end intake port 16 defines the intake zone of the evacuator tube, i.e., the end zone in which all of the entrainment of saliva and debris occurs. In FIG. 3 this intake zone is defined by two dotted lines 25 and 26 and, as heretofore stated, the end zone should be relatively short to concentrate the entrainment in a region close to the source of the debris.

In accord with the teaching of the invention the evacuator tube 10 is further provided with auxiliary intake openings at least the major portion of which lie in the intake zone and which extend over at least the major portion of the length of the intake zone with the major portion of the area of the auxiliary intake ports in the upper half of the intake zone. It is contemplated that the intake openings or at least most of the intake openings will be relatively close to the opposite side edges of the end intake port 16 and preferably will be elongated to extend substantially parallel to the side edges of the end intake port. In this first embodiment of the invention, the auxiliary intake ports comprise two slots 28 in the wall of the evacuator tube 10, each slot being of a length several times its width and each slot extending over the major portion of the length of the intake zone with each slot substantially parallel with the corresponding side edge of the elongated end intake port 16.

It is contemplated that the total cross sectional area of the two auxiliary slots 28 will be substantially less than the cross sectional area of the bore of the evacuator tube, the combined cross sectional areas of the two slots being preferably in the range of 30–70% of the cross sectional area of the tube bore. In this particular embodiment of the invention the total cross sectional area of the two auxiliary ports 28 is approximately 0.4 of the cross sectional area of the tube bore. Moreover, the cross sectional area of the end clearance space 22 as viewed in FIG. 4 is approximately 0.3 of the cross sectional area of the tube bore and the combined cross sectional areas of the two side clearance spaces 24 as viewed in FIG. 3 is approximately 0.4 of the cross sectional area of the tube bore. These dimensions are only by way of example and may be varied under the teachings of the invention.

The manner in which the described evacuator tube functions for its purpose may be understood by considering different positions of the intake zone of the evacuator tube relative to oral surfaces.

First, let it be assumed that neither the end intake port 16 nor the two auxiliary intake ports 28 are blocked or hampered by contact with or close proximity to an oral surface. Since the effective cross sectional area of the end intake port 16 is the cross sectional area of the tube bore, the intake end of the tube is not restricted and the rate of air flow through the evacuator tube depends upon the length and inside diameter of the tube and the pressure differential across the length of the tube. Under these circumstances, the difference between atmospheric pressure and the pressure inside the tube will drop in a linear manner to zero at the intake zone as indicated in FIG. 6. Since the maximum rate of intake flow is limited only by the flow capacity of the tube itself, i.e., by the length and diameter of the tube together with the pressure drop across the length of the tube and since the elongated end intake port 16 admits enough air for the maximum rate of flow through the tube, the addition of the auxiliary side openings 28 does not increase the rate of flow through the tube.

To consider another operating condition, let it be assumed that the elongated end intake port 16 is placed in face-to-face contact with a relatively hard and unyielding surface such as the surface of a tooth structure or the surface of mucosa covering hard bone so that the intake flow is limited to the two auxiliary ports or slots 28 together with the three clearance spaces 22, 24 around the cut-away rim of the end intake port 16. If the effective cross sectional areas of the clearance spaces 22, 24 are dimensioned substantially as heretofore stated, the hard unyielding surface being substantially flat, the total cross sectional area of the intake ports in terms of the cross sectional area of the tube bore will be the sum of 0.4 for the two auxiliary ports or slots 28; 0.4 for the two side clearance spaces 24; and 0.3 for the end clearance space 22, the total cross sectional area being 1.1 times the cross sectional area of the tube bore. Thus, atmospheric air will enter the intake zone of the evacuator tube just about as freely as if the elongated end intake port 16 were not in face-to-face abutment with an unyielding surface. Under these circumstances, air will flow through the evacuator tube at approximately the maximum rate with the pressure dropping uniformly as indicated in FIG. 6.

To consider a third operating condition, let it be assumed that a tissue block occurs, i.e., the end intake port 16 is placed face to face against relatively soft tissue, for example against one side of the tongue or against an inner cheek surface or against tissue at the bottom of the mouth with the tissue distorted into the evacuator tube to completely block flow into the end intake port 16. Under these circumstances only the two auxiliary ports or side slots 28 are effective for intake flow.

Since the combined cross sectional area of the two auxiliary ports 28 is approximately 0.4 times the cross sectional area of the tube bore, the entrance to the evacuator tube is drastically restricted with consequent reduction of the overall rate of flow through the tube. As a consequence, a vacuum condition prevails inside the tube up to the intake zone, the difference between atmospheric pressure and the pressure inside the tube along the length of the tube being indicated in a general way by FIG. 7. In FIG. 7 a relatively high pressure differential exists at the beginning of the intake zone with the result that a steep pressure drop occurs across the intake zone as indicated by the inclined line 30.

Under these conditions the two auxiliary intake ports 28 function as orifices with a substantial pressure difference across each orifice. Since the velocity of flow of air through an orifice varies directly as the pressure drop across the orifice and inversely as the size of an orifice, there are two reasons for especially high velocity through the two auxiliary openings 28, i.e., first, the fact that the cross sectional area for intake flow is reduced to substantially less than the cross sectional area of the tube bore and, second, the fact that at the same time the pressure drop across the clear intake ports increases drastically from the pressure drop in the intake zone shown in FIG. 6 to the pressure drop shown in FIG. 7. Thus, although the inflow into the evacuator tube is limited to the two relatively small auxiliary ports or side slots 28, nevertheless, the entrainment efficiency at the two auxiliary ports greatly increases and may nearly, if not completely, compensate for the reduced total effective cross sectional area of the intake ports.

It is important to note that when the intake is limited to the auxiliary ports or slots 28, the intake extends along the major length of the intake zone and it is especially advantageous that the auxiliary ports or slots 28 are close to the opposite side edges of the elongated end intake port 16 so that all of the high velocity entrainment of saliva and debris occurs in an elongated region that is exceedingly close to the origin of the debris.

It is to be noted that there is no auxiliary hole on the back side of the tube in this embodiment, the back side being the side opposite to the elongated end intake port 16. The back side is often used to hold back tissue of the cheek or tongue and any auxiliary intake opening on the back side would be blocked by the tissue.

It is to be emphasized that the evacuator tube 10 does not have any substantial portion of the intake ports extending beyond or outside of the described intake zone. If an intake port were provided in the wall of the evacuator tube 10 at a point spaced a substantial distance beyond the intake zone, the pressure difference would drop at that point with the consequence that the pressure differential in the intake zone would drop with corresponding drastic loss of entrainment efficiency in the intake zone.

In the Halligan Patent No. 3,319,628 the end of an evacuator tube is cut off at an angle to provide an elongated end intake port defining an intake zone and the evacuator tube is further provided with an intake port that is spaced from the intake zone by at least one and one-half times the inside diameter of the evacuator tube. If such an additional intake port were provided in the present disclosure outside of the boundaries of the intake zone and if the additional intake port had an effective cross sectional area equal to the cross sectional area of the tube bore, the difference between atmospheric pressure and the pressure inside the tube would drop to zero at the additional opening, as indicated by the line 32 in FIG. 8. No pressure differential would then exist at the intake zone and all of the intake would be through the additional port which is outside of the intake zone and much too far from the work area where the debris originates. On the other hand, if the effective cross sectional area of the additional intake port outside of the intake zone were less than equivalent to the cross sectional area of the tube bore, the pressure drop would not be so drastic as indicated by the line 34 in FIG. 8. The pressure difference would drop to some relatively low value at the location of the additional intake port with the result that only a small residual pressure drop would be available in the intake zone as indicated by the line 35 in FIG. 8.

The second embodiment of the invention shown in FIGS. 9 and 10 is identical with the first embodiment except in the form of the auxiliary intake ports in the intake zone. In this embodiment the auxiliary intake ports are in the form of slots 40 which extend lengthwise of the intake zone and are at least approximately parallel to the axis of the tube instead of being approximately parallel to the side edges of the elongated end intake port 16. Minor portions of the slots 40 extend beyond the intake zone. The total cross sectional area of the intake ports 40 may be, for example, 0.5 to 0.6 of the cross sectional area of the tube bore. It is apparent that this second embodiment of the invention functions in substantially the same manner as the first embodimet.

The third embodiment of the invention shown in FIGS. 11 and 12 is characterized by auxiliary ports in the form of relatively small holes 42 distributed over the length of the intake zone. Preferably, the small holes are arranged in rows as shown, there being one row close to and substantially parallel to each of the opposite side edges of the elongated end intake port 16. A minor portion of each row extends beyond the intake zone, the major portion of each row being in the upper half of the intake zone. In addition, two small holes are centrally located as shown, but may be omitted. In any event, the total cross sectional area of the small holes should be in the range of 30% to 70% of the cross sectional area of the tube bore.

I claim:
1. An oral evacuator comprising:
   a tube for connection to a vacuum source and for insertion into a patient's mouth to evacuate saliva and to entrain debris created by dental work,
   said tube having an intake end cut off at an acute angle to form an elongated end intake port, the axial extent of the end intake port defining a longitudinal intake zone at the end of the tube,
   said tube having a plurality of auxiliary intake ports at least the major portion of the area of which lies in the intake zone and which extend along the major portion of the length of the intake zone to be effective to entrain saliva and debris when said elongated end port is blocked, the total cross sectional area of the auxiliary intake ports being in the range of 30% to 70% of the cross sectional area of the tube bore to restrict flow into the tube when the end intake port is blocked, said tube being free of intake openings beyond said intake zone, whereby with said end intake port blocked, a substantial pressure drop is created at the intake zone across said auxiliary intake ports for increased velocity of intake flow through the auxiliary intake ports along the length of the intake zone for increased efficiency of entrainment of saliva and debris through the auxiliary intake ports to compensate at least in part for the blockage of the elongated end intake port.

2. An oral evacuator as set forth in claim 1 in which the major portion of the area of the auxiliary intake ports is in the upper half of the intake zone.

3. An oral evacuator as set forth in claim 1 in which the ratio of the total cross sectional area of the auxiliary intake ports to the inner cross sectional area of the tube is in the range of 0.3 to 0.6.

4. An oral evacuator as set forth in claim 1 in which said auxiliary intake ports comprise two slots in the wall of the tube adjacent the opposite side edges of the elongated end intake port and substantially parallel thereto.

5. An oral evacuator as set forth in claim 4 in which the major portion of each of the two slots lies in the upper half of the intake zone.

6. An oral evacuator as set forth in claim 4 in which the total cross sectional area of the two slots is between 40% and 60% of the cross sectional area of the tube bore.

7. An oral evacuator as set forth in claim 1 in which the opposite side edges of said elongated end intake port are cut away to provide two opposite clearance spaces for intake flow when the elongated end intake port is placed in face-to-face contact with a substantially flat surface.

8. An oral evacuator as set forth in claim 5 in which the tapered end of the tube formed by the acute angle cut is truncated to form an end clearance space for intake flow when the elongated end intake port is placed in face-to-face contact with a substantially flat surface.

9. An oral evacuator as set forth in claim 7 in which the combined cross sectional area of said two clearance spaces at the opposite sides of the elongated end intake port is less than 50% of the cross sectional area of the tube bore.

10. An oral evacuator as set forth in claim 8 in which the cross sectional area of said end clearance space is not substantially more than one-third of the cross sectional area of the tube bore.

11. An oral evacuator as set forth in claim 1 in which said auxiliary intake ports comprise two slots in the wall of the tube adjacent the opposite side edges, respectively, of the elongated end intake port.

12. An oral evacuator as set forth in claim 11 in which said slots are substantially parallel to the corresponding side edges of the elongated end intake port.

13. An oral evacuator as set forth in claim 11 in which said slots are at least approximately parallel to the longitudinal axis of the tube.

14. An oral evacuator as set forth in claim 6 in which said auxiliary openings comprise a plurality of relatively small holes in the wall of the tube distributed over at least the major portion of the length of the intake zone, the total cross sectional area of said small holes being at least 0.35 of the cross sectional area of the tube bore.

15. An oral evacuator as set forth in claim 14 in which said small holes are arranged in rows with two rows adjacent the opposite side edges, respectively, of the elongated end intake port substanially parallel thereto.

References Cited

UNITED STATES PATENTS

| 2,161,151 | 6/1939 | Freedman | 32—33 |
| 3,090,122 | 5/1963 | Erickson | 23—33 |

FOREIGN PATENTS

| 592,194 | 8/1925 | France. | |

ROBERT PESHOCK, Primary Examiner

128—275